US010657195B2

(12) United States Patent
Stone et al.

(10) Patent No.: US 10,657,195 B2
(45) Date of Patent: May 19, 2020

(54) METHOD, SYSTEM, APPARATUS, AND PROGRAM FOR IDENTIFYING AND REWARDING SENDER AND RECEIVER OF SHARED URLS AND RECOMMENDATIONS BY USING DOUBLE-SIDED AFFILIATE LINK

(71) Applicant: Split Technologies, Inc., New York, NY (US)

(72) Inventors: Alexander Doran Stone, New York, NY (US); Stephen Raymond, New York, NY (US); Marcin Koziol, Katowice (PL)

(73) Assignee: SPLIT TECHNOLOGIES, INC., New York, NY (US)

( * ) Notice: Subject to any disclaimer, the term of this patent is extended or adjusted under 35 U.S.C. 154(b) by 0 days.

(21) Appl. No.: 15/857,400

(22) Filed: Dec. 28, 2017

(65) Prior Publication Data

US 2018/0253502 A1 Sep. 6, 2018

Related U.S. Application Data

(60) Provisional application No. 62/577,014, filed on Oct. 25, 2017, provisional application No. 62/467,004, filed on Mar. 3, 2017.

(51) Int. Cl.
| | | |
|---|---|---|
| *G06F 16/955* | (2019.01) | |
| *H04L 29/08* | (2006.01) | |
| *G06Q 30/02* | (2012.01) | |
| *H04L 12/58* | (2006.01) | |
| *G06F 16/335* | (2019.01) | |
| *G06F 16/9535* | (2019.01) | |
| *G06Q 50/00* | (2012.01) | |

(52) U.S. Cl.
CPC ........ *G06F 16/9558* (2019.01); *G06F 16/337* (2019.01); *G06F 16/9535* (2019.01); *G06Q 30/02* (2013.01); *H04L 51/32* (2013.01); *H04L 67/02* (2013.01); *H04L 67/146* (2013.01); *H04L 67/306* (2013.01); *G06Q 50/01* (2013.01)

(58) Field of Classification Search
CPC .... G06F 16/955; G06Q 10/04; G06Q 20/387; G06Q 30/0214
See application file for complete search history.

(56) References Cited

U.S. PATENT DOCUMENTS

| | | | |
|---|---|---|---|
| 9,268,750 B2 | 2/2016 | Mishra | |
| 2012/0047180 A1 | 2/2012 | Kirshenbaum | |
| 2013/0085854 A1* | 4/2013 | Masuko | G06Q 30/0601 |
| | | | 705/14.53 |
| 2013/0275179 A1 | 10/2013 | Marshall | |
| 2013/0346302 A1 | 12/2013 | Purves et al. | |
| 2014/0214533 A1 | 7/2014 | Box et al. | |

(Continued)

OTHER PUBLICATIONS

Dropbox, *Earn more space by referring friends* (website), May 1, 2017, available at https://www.dropbox.com/help/space/earn-space-referring-friends.

(Continued)

*Primary Examiner* — Sanchita Roy
(74) *Attorney, Agent, or Firm* — Ladas & Parry, LLP

(57) ABSTRACT

A method, system, apparatus, and program for creating a doable-sided affiliate link (DSAL) from a URL and using the DSAL to identify and reward a sender and a receiver.

20 Claims, 15 Drawing Sheets

(56) References Cited

U.S. PATENT DOCUMENTS

| | | |
|---|---|---|
| 2015/0163311 A1 | 6/2015 | Heath et al. |
| 2016/0283951 A1* | 9/2016 | Boss .................. G06Q 30/0201 |
| 2016/0350780 A1* | 12/2016 | G ....................... G06Q 30/0214 |
| 2017/0046729 A1 | 2/2017 | Breslin |

OTHER PUBLICATIONS

SproutVideo, *New double-sided referrals!* (website), Aug. 21, 2014, available at http://sproutvideo.com/blog/announcing-double-sided-referrals.html.

International Search Report and Written Opinion dated Mar. 19, 2018 in connection with International Appln. No. PCT/US17/68751.

International Preliminary Report on Patentability (IPRP) dated May 16, 2019 for Application No. PCT/US2017/068751.

* cited by examiner

| source_final | commission_time | user_id_txn | commission_id | url | link_time | parent_user_id | vendor_id | child_user_id |
|---|---|---|---|---|---|---|---|---|
| Commission-Parent | 2017-08-18 13:55 | 755337 | 412 | https://example1.com | 2017-08-14 02:20 | 755337 | 44300 | |
| Commission-Child | 2017-08-18 13:55 | 879991 | 412 | https://example1.com | 2017-08-14 02:20 | 755337 | 44300 | 879991 |
| Commission-Parent | 2017-08-18 14:00 | 755337 | 414 | https://example2.com | 2017-08-14 02:25 | 755337 | 45975 | |
| Commission-Child | 2017-08-18 14:00 | 900000 | 414 | https://example2.com | 2017-08-14 02:25 | 755337 | 45975 | 900000 |
| Commission-Parent | 2017-08-18 14:05 | 755337 | 416 | https://example3.com | 2017-08-14 02:30 | 755337 | 44495 | |
| Commission-Child | 2017-08-18 14:05 | 879991 | 416 | https://example3.com | 2017-08-14 02:30 | 755337 | 44495 | 879991 |
| Commission-Parent | 2017-08-18 14:10 | 755337 | 418 | https://example4.com | 2017-08-14 02:35 | 755337 | 44300 | |
| Commission-Child | 2017-08-18 14:10 | 922222 | 418 | https://example4.com | 2017-08-14 02:35 | 755337 | 44300 | 922222 |
| Commission-Parent | 2017-09-21 02:59:28 | 1313229 | 627 | https://example4.com | 2017-09-10 01:17:06 | 1313229 | 43986 | |
| Commission-Child | 2017-09-21 02:59:28 | 129296 | 627 | https://example4.com | 2017-09-10 01:17:06 | 1313229 | 43986 | 129296 |
| Commission-Parent | 2017-09-22 01:59:28 | 1431636 | 635 | https://example5.com | 2017-09-13 11:45:10 | 1431636 | 45975 | |
| Commission-Child | 2017-09-22 01:59:28 | 1431805 | 635 | https://example5.com | 2017-09-13 11:45:10 | 1431636 | 45975 | 1431805 |
| Commission-Parent | 2017-09-21 09:59:24 | 1467100 | 633 | https://example6.com | 2017-09-14 12:59:53 | 1467100 | | |
| Commission-Parent | 2017-09-21 02:59:32 | 1537534 | 632 | https://example7.com | 2017-09-19 17:38:19 | 1537534 | 44495 | |
| Commission-Child | 2017-09-21 02:59:32 | 1537887 | 632 | https://example7.com | 2017-09-19 17:38:19 | 1537534 | 44495 | 1537887 |
| Commission-Parent | 2017-09-21 02:59:31 | 1537534 | 631 | https://example7.com | 2017-09-19 17:38:19 | 1537534 | 44495 | |
| Commission-Child | 2017-09-21 02:59:31 | 1537887 | 631 | https://example7.com | 2017-09-19 17:38:19 | 1537534 | 44495 | 1537887 |
| Commission-Parent | 2017-09-21 02:59:31 | 1471161 | 630 | https://example8.com/37020193 | 2017-09-19 23:46:11 | 1458623 | 44300 | |
| Commission-Child | 2017-09-21 02:59:31 | 1458623 | 630 | https://example8.com/37020193 | 2017-09-19 23:46:11 | 1458623 | 44300 | |
| Commission-Parent | 2017-09-21 02:59:30 | 1521950 | 629 | https://example9.com/us/shop | 2017-09-20 20:37:58 | 1521950 | 51310 | |
| Commission-Child | 2017-09-21 02:59:30 | 1563576 | 629 | https://example9.com/us/shop | 2017-09-20 20:37:58 | 1521950 | 51310 | 1563576 |

FIG. 9

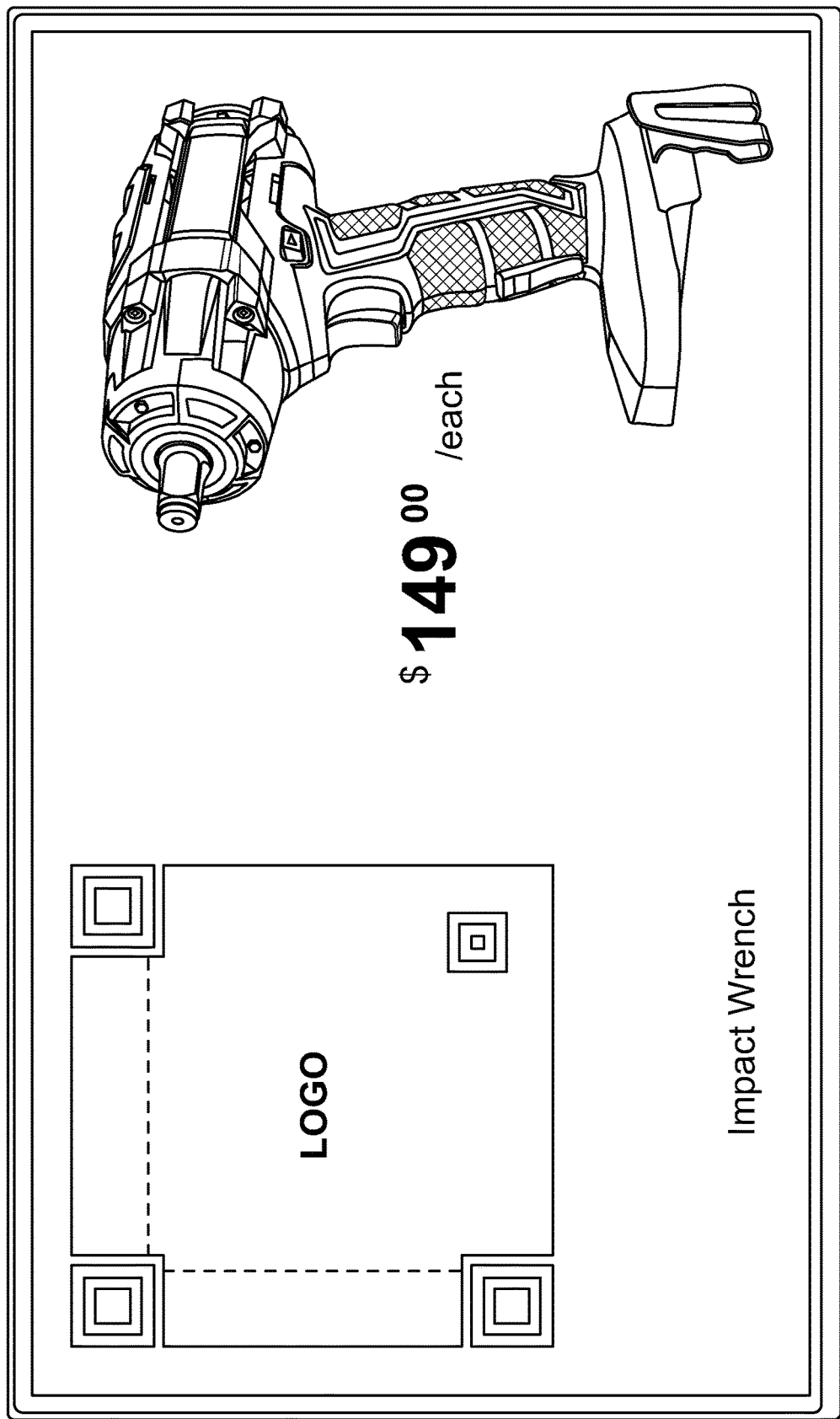
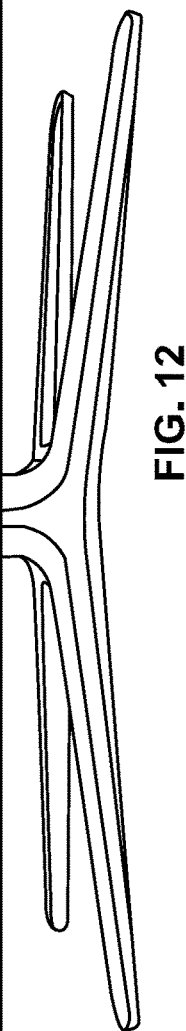
FIG. 12

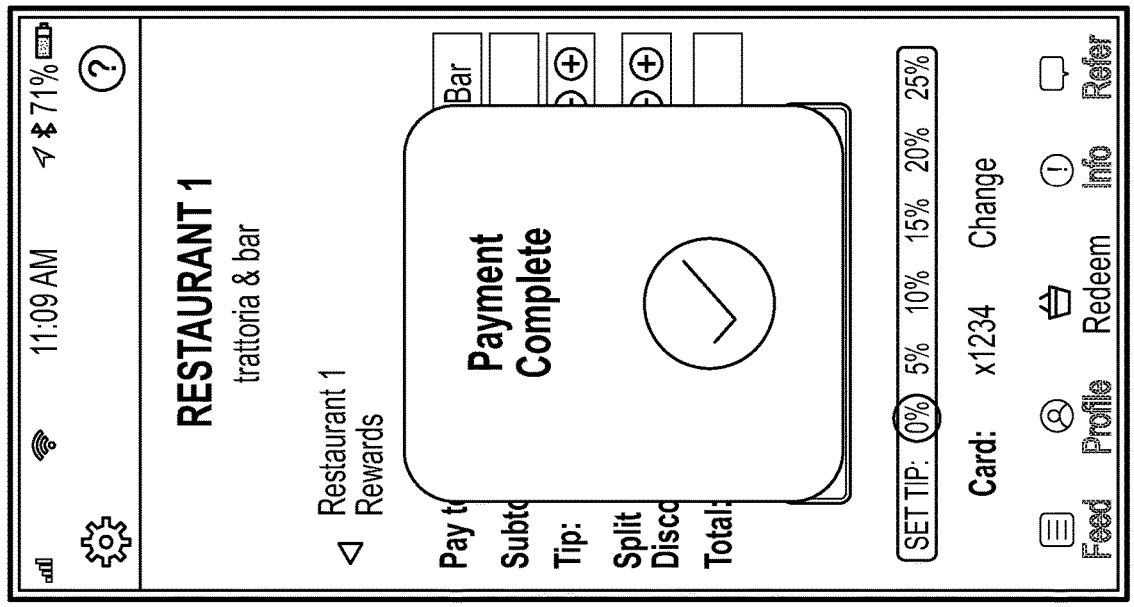

METHOD, SYSTEM, APPARATUS, AND PROGRAM FOR IDENTIFYING AND REWARDING SENDER AND RECEIVER OF SHARED URLS AND RECOMMENDATIONS BY USING DOUBLE-SIDED AFFILIATE LINK

CROSS-REFERENCE TO RELATED APPLICATION

The present nonprovisional application claims the benefit of U.S. Provisional Application Nos. 62/467,004 filed on Mar. 3, 2017 and 62/557,014 filed on Oct. 25, 2017 and incorporates the same by reference.

BACKGROUND OF THE INVENTION

Field of the Invention

The present invention generally relates to a method, system, apparatus, and program for transforming a link or URL into a double-sided affiliate link (DSAL) in order to identify and reward a sender and a receiver of the DSAL.

Related Art

Since the dawn of commerce, goods and services providers have attempted to identify and reward persons who refer others to their goods and/or services. Thus, so-called "referral systems," wherein a referrer and/or a referee gets a reward from the goods and services provider, have been used by many companies.

As an example, when a person finds a product he or she likes on the internet and shares a link to the provider's website with another person who eventually makes a purchase from the website, the provider often finds it useful to learn who the referrer and/or the referee were so that the provider can reward them. But to this point there has been no efficient way to learn this information. Indeed, conventional referral systems are inadequate in a number of ways. Notably, for example, they lack efficiency with regard to encouraging, tracking, and rewarding both sides of a referral, right from their source. The present invention provides a solution to these and other problems.

SUMMARY OF THE INVENTION

Conventional systems, for example, have used "referral codes," Referral codes are unique "strings" of letters and numbers that are specific to a sender and can be shared with a recipient, who must then input the code into a specified "referral code box" during an online checkout in order to trigger a referral reward. Typically, in conventional systems, these codes are created by the retailers themselves and are specific not only to particular products but also to particular referrers (influential people who are provided with the codes and encouraged to distribute them). If ever a particular referral code is applied correctly during checkout, the retailer will know that the sale was driven by a particular referring party and can therefore reward both sides of the transaction.

To this day, however, referral codes have proven themselves to be too specific and too difficult to find and use in order to address the problem in a broad, reliable way. Thus, one drawback to conventional systems and methods is that it can be difficult for the retailer to effectively, simply, and promptly determine who the referrer and the referee are without first creating, and distributing specific codes themselves (a process which introduces significant friction and limits to scale). Using referral codes is typically a time-consuming and highly manual process that requires users to constantly be remembering, searching for, copying, and pasting specific referral codes into designated boxes (assuming they even exist in the first place).

One-sided affiliate links have been used by many companies as well. Unlike referral codes, they allow companies to identify and reward referrals without the need for codes, but they still fail to allow companies to simultaneously do the same for the referee.

The foregoing and other problems are overcome by an improved method for identifying and rewarding a sender and/or a receiver of the shared link or URL, and also by a system, apparatus, and program that operate in accordance with the method. More broadly, the invention can eliminate many of the difficulties associated with generating, tracking, and rewarding everyday referrals by transforming any URL into a "double sided affiliate link" or DSAL, which can be used to instantly identify and reward both sides of a transaction without the need for highly specific and frictional referral codes.

For example, the invention in one aspect provides a solution to the problem of "single-sided" affiliate commissions, in that by virtue of the features of the invention the sender of a shared link or URL can be effectively and efficiently identified, and also the receiver of the shared link or URL can be identified. This allows both the sender and the receiver to share or "split" any resulting affiliate commissions. With the present invention as described herein of one-click double-skied affiliate links (DSALs), which can be created at the touch of a button the moment a user wishes to share a link, unique two-sided referral information is automatically embedded within every shared link so that little if any additional effort is required to confirm and/or reward the referral. In an example business model, the retailer can then easily distribute a reward to both the sender and the receiver.

The invention according to one example embodiment provides a method implemented on a computer having a processor and a memory for identifying and rewarding a sender of a first device and a receiver of a second device by transforming the original link into a double-sided affiliate link (DSAL). The first device or the second device may be, but is not limited to, a mobile device, a desktop computer, and a tablet PC, for example. The method comprises (a) displaying a share icon on the first device; (b) receiving, from the first device, a share request when the sender clicks on the share icon displayed on the first device to share the link with the receiver; (c) generating a DSAL based in part on the URL address and sending a message including the DSAL to the second device; (d) receiving, from the second device, a notification when the receiver clicks on the DSAL in the message on the second device; (e) generating first data identifying the second device, and storing the first data as cookies in the second device; and (f) determining whether the first data matches any existing user profile stored in a database on a server. The share icon can be any icon displayed on a screen of the first device.

According to another aspect of the invention, the method further comprises: (g) its response to the determination performed in step (f), displaying a banner on the second device providing an option to log in to a social media account if the first data does not match any existing user profile stored in the database; and (h) in response to presentation of the option in step (g), receiving, from the second device, second data identifying, the receiver provided by the social media account when the receiver logs in to the social media account through the banner. As an alternative, instead of using the social media account, an account for any identification software can be used. An account for an identification software can be, for example, an account for a company website that provides DSAL transformation service (e.g., Split Technologies Inc.), an account for a third party newspaper website, or an account for a third party social media website.

According to another aspect of the invention, the method further comprises: (i) determining whether the second data provided b the social media account matches any existing user profile in the database; and (j) in response to the determination performed in step (i), storing the first data in a user profile that matches the second data in the database, or creating a new user profile of the receiver in the database based on the first and/or second data.

According to another aspect of the invention, the method further comprises: (k) rewarding the sender and/or the receiver identified by the first and/or second data based on information provided by an affiliate network.

According to another aspect of the invention, the first data comprises, for example, at least one of cookies, an IP address, a screen brightness level, a phone type, a UDID (unique device identifier), a web browser type, or any other information that might help identify the receiver.

According to another aspect of the invention, the second data comprises at least one of the receiver's identification number of any identification software (or a social media account), name, birthday, location, address, friends list, favorite movies, favorite websites, favorite companies, marital status, and other information that can be used to identify a user.

The invention according to another example embodiment provides a method implemented on a computer having a processor and a memory for transforming a link into a DSAL, the method comprising (a) creating a parent DSAL specific to a sender, based at least on an original URL and sender information, (b) determining whether a visitor to the parent DSAL is a qualified user, a user with a temporary ID, or a new user, by comparing data stored in the database with first data collected from a visitor device, wherein the first data can comprise cookies of a web browser stored in the visitor device, and (c) creating a child DSAL specific to the sender and the visitor based at least on the parent DSAL.

According to another aspect of the invention, the method for transforming a link into a DSAL further comprises (d) determining whether the visitor is a qualified user, a user with a temporary ID, or a new user by comparing the data stored in the database with second data, wherein the second data can comprise information provided by an identification software.

According to another aspect of the invention, the method for transforming a link into a DSAL further comprises (e) displaying a login screen to the identification software on the visitor device.

According to another aspect of the invention, the method for transforming a link into a DSAL further comprises (f) displaying content of the original URL on the visitor device.

According to another aspect of the invention, the method for transforming a link into a DSAL is characterized in that the information provided by the identification software can be obtained while the visitor device maintains a log-in status to the identification software.

According to another aspect of the invention, the method for transforming a link into a DSAL is characterized in that the identification software is a social media website.

According to another aspect of the invention, the method for transforming a link into a DSAL further comprises (g) creating a temporary ID for the visitor device, which cannot be identified by steps (b) or (d).

According to another aspect of the invention, the method for transforming a link into a DSAL further comprises (h) receiving purchase information from a vendor, (i) receiving commission information from an affiliate network, (j) determining who the sender and the visitor were based on the child DSAL, and (k) determining rewards for the sender and the visitor based on reward data, wherein the reward data comprises the purchase information and the commission information.

The present invention meets the above-identified needs by providing a system, method, and computer program product for identifying and rewarding a sender and a receiver of a shared link or URL. Another advantage of the present invention is that a company can identify and reward the sender (referrer) a id the receiver (referee) promptly, thereby providing incentives for the users to refer others to the company's website. By virtue of the features of the present invention any link care be turned into a share/split link or DSAL.

The present invention can be implemented using hardware, software, or a combination of both, including using a mobile application or mobile "app." As well known in the art, an app is a software application designed to run on mobile devices such as smartphones. Mobile apps are available through application distribution platforms, which are typically operated by the owner of the mobile operating system. Usually, mobile apps are downloaded from the platform to a target device such as a smartphone. Mobile apps are also sometimes downloaded to less mobile computers, e.g., laptops or desktops.

A "smartphone" as used herein includes the class of mobile phones or devices built on a mobile operating system, with more advanced computing capability and connectivity than a feature phone. Smartphones typically include high-resolution touch screens and web browsers that display standard web pages, as well as mobile-optimized sites. High-speed data access is provided by, e.g., Wi-Fi or Mobile Broadband. Common mobile operating systems in use include but are not limited to Apple's iOS, Nokia's Symbian, RAM's BlackBerry OS, Google's Android, Samsung's Bada, Microsoft's Windows Phone, and Hewlett-Packard's webOS. Such operating systems can be installed on many different phone models.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be wore readily understood from a detailed description of the exemplary embodiments taken in conjunction with the following figures:

FIG. 9 is a table that shows an example set of transaction stored in a database in accordance with an example embodiment of the present invention.

FIG. 12 shows an example screen of a TV with a QR code, which directs a "clicker" to a parent DSAL.

FIG. 17 shows an example screen of a mobile phone where a payment was made.

Figure 1:
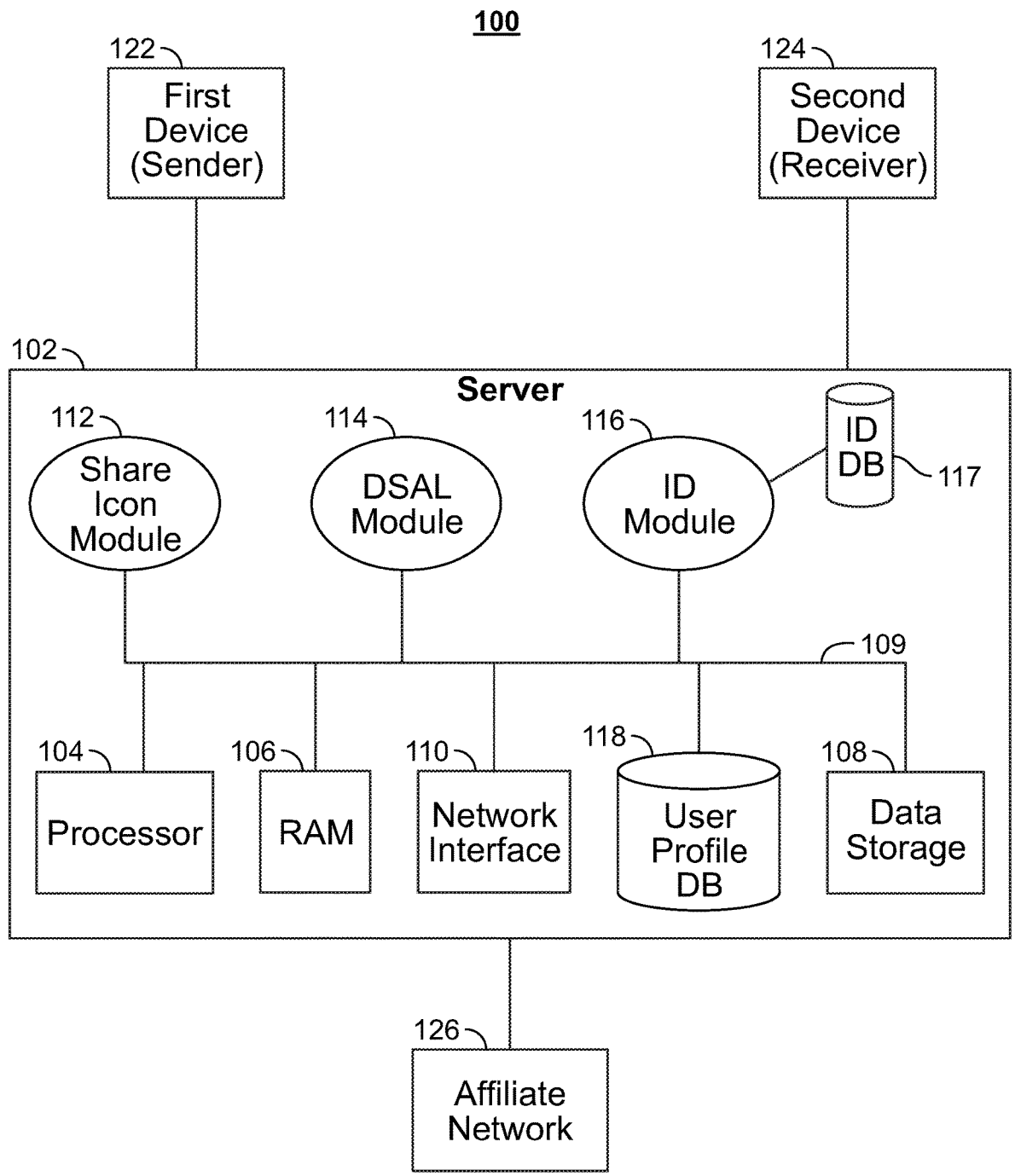
FIG. 1 is at example embodiment of a system or apparatus that operates in accordance with the method of the present invention.

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

An example embodiment of the invention provides a method for identifying and rewarding a sender and/or a receiver of a shared URL by using a double-sided affiliate link ("DSAL") and also a system, apparatus, and program that operate in accordance with the method.

One example embodiment of the invention is a double-sided affiliate link ("DSAL") application which is a software tool that is designed to transform any URL address into a double-sided affiliate link, thereby enabling both the sender and recipient to share or "split" rewards, including any resulting affiliate commissions. This tool can be accessed with an electronic device, for example, a desktop computer, laptop, a mobile device, or others, through a website or share extension which installs directly into a web browser, desktop menu, or mobile share menus for applications and browsers, for example. The website can be, e.g., the website of the company that is providing the app or program for creating the DSAL and for identifying the sender and receiver and sharing the affiliate commissions.

It is noted that "click on" as used herein refers to an act of clicking on, tapping on, visiting a link, or scanning a machine-readable optical label, or to performing an act that results in opening a desired link.

It is noted that "cookies" as used herein refers to a small piece of data sent from a website and stored on a user's computer by the user's web browser while the user is browsing.

It is noted that "DSAL provider" as used herein is a term that the Applicant invented, and refers to an entity that provides technologies to create and utilize a DSAL and carry out the invention.

It is noted that "fingerprint" as used herein refers to a random variable(s) assigned to a user. Fingerprints are created using for example the stateless UUID (universally unique identifier) method and can be gathered from (1) cookies, (2) logging in to a social media, or (3) grabbing the existing fingerprint of the user from the database, or if the user is a user with a temporary ID, the fingerprint can be generated without needing to lookup in the database by generating a unique identifier according to for example the UUID method without needing to know what the existing set of UUIDs are that have already been assigned to the user. The fingerprint is unique to the user and stateless. User IDs can be tied to fingerprints. Once a user has signed up, they have a permanent user ID that is assigned in the database. A user can have multiple fingerprints that are unique to them. In other words, a fingerprint can uniquely map to a user ID, and a user ID can uniquely map to a set of fingerprints.

It is noted that "qualified user" as used herein refers to a user who fully signed up with the system and/or was accepted by a security system as a compliant user.

It is noted that "social media" as used herein refers to computer-mediated technologies that facilitate the creation and sharing of information, ideas, career interests and other forms of expression via virtual communities and networks. Examples include, but are not limited to, Baidu Tieba, Facebook, Gab, Google+, Instagram, LinkedIn, Pinterest, Reddit, Snapchat, Tumblr, Twitter, Viber, VK, WeChat, Weibo, WhatsApp, Wikia, YouTube, etc.

It is noted that when the term "transform" is used with a link, URL, or the likes as herein, its definition includes "create" or "generate."

FIG. 1 is an example embodiment of a system or apparatus 100 that operates in accordance with the method(s) of the present invention. In FIG. 1 a server 102 is controlled by, e.g., the company or entity that is providing the DSAL service. The server 102 includes a processor 104, a RAM 106, and a data storage unit 108, which may be a hard drive or other computer readable media known in the art. Input devices such as a keypad or keyboard or other peripherals, and output devices such as a display device, an audio device, etc., are not shown in FIG. 1 but of course may be part of the server 102.

The server 102 also has a network interface 110 which can, for example, include a wired or wireless network device operable to communicate data to and from a network. The network can include one or more local area networks (LANs) and/or a wide area network (WAN) such as the Internet Other architectures can of course be used, and the invention is of course not limited to the example embodiment shown in FIG. 1.

The server includes a share icon module 112, a DSAL module 114, and an ID module 116, each of which is explained below. A first device 122 (such as of a sender) and a second device 124 (such as of a receiver) may be smart phones or computers or the like and communicate with the server 102, as does the affiliate network (retailer server) 126. Of course, while not shown in FIG. 1 sender and recipient devices and an affiliate networks may be involved.

The server 102 has a bars system 109 including, for example, a data bus and a motherboard, which can be used to establish and control data communications between the components 104, 106, 108, 110, 112, 114, 116, 118, etc, including the input and output devices not shown.

As noted above, the "one-click" tool of the present invention can transform any URL into a double-sided affiliate link ("DSAL"), thereby enabling both the sender and recipient to share or "split" any resulting affiliate commissions. This tool can be accessed for example through the server 102 or through a share extension that installs directly into mobile share menus for apps and browsers, according to one example embodiment.

Figure 2:
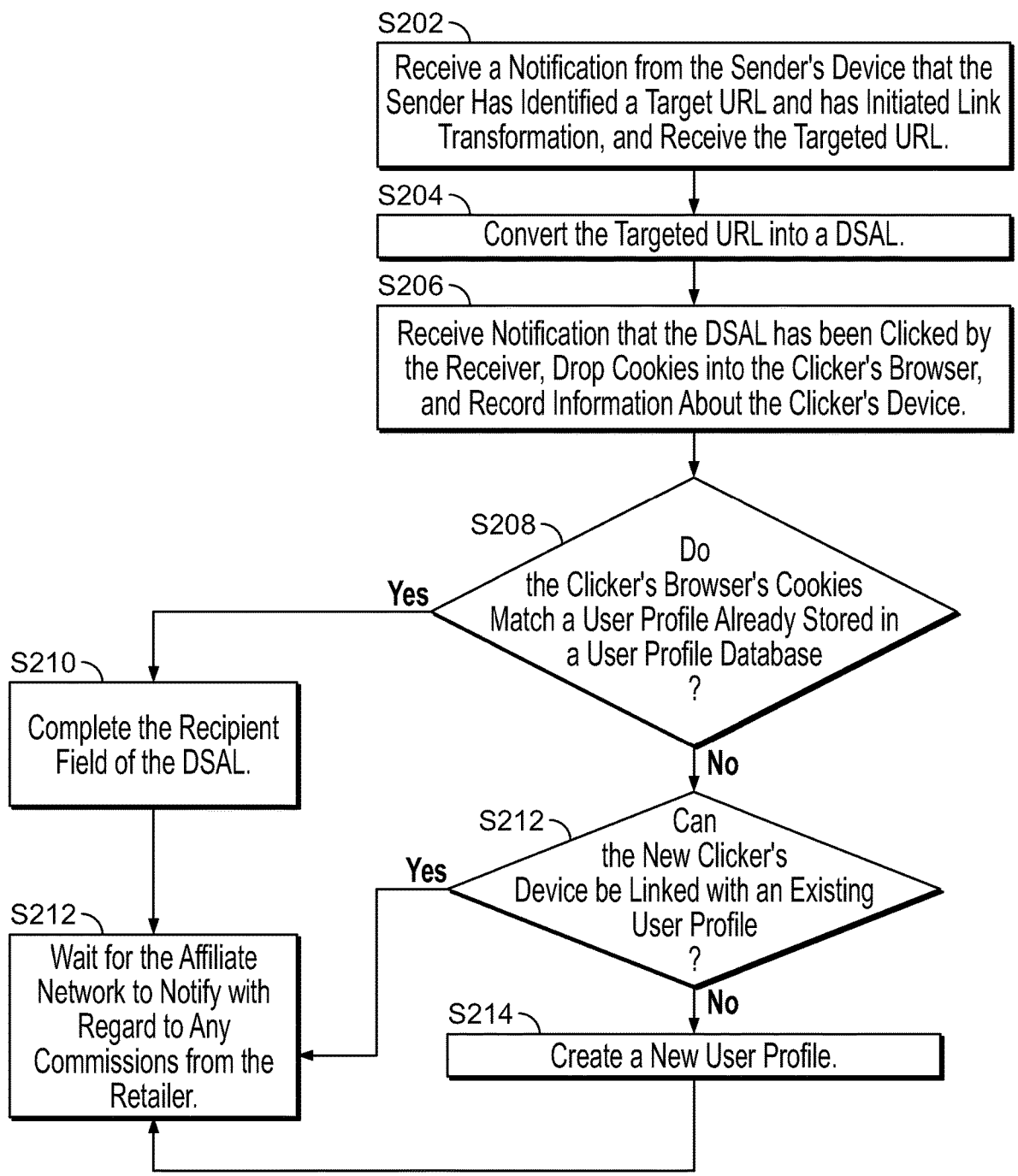
FIG. 2 is a flowchart showing the steps of a method of the present invention in an example embodiment, that can operate in accordance with the system of FIG. 1.

FIG. 2 is a flowchart showing the steps of a method 200 of the present invention in an example embodiment, that can operate in accordance with the system of FIG. 1. It is noted that while FIG. 1 shows the share icon module 112, the DSAL module 114, and the ID module 116 as part of the server 102 being operated by a DSAL provider such as Split Technologies, Inc, ("Split") and communicating with devices 122, 124, at least some of the processes carried out by these modules 112, 114, and 116 can be performed by an app installed on devices 122, 124.

In step S202, the share icon module 112 receives a notification from the sender's device (first device 122 having the app installed thereon) that the sender using the app has identified a desired or targeted URL and has tapped a link transformation button to initiate link transformation. The share icon module 112 receives the targeted URL.

In step S204 the DSAL module 114 converts the targeted URL into a double-sided affiliate link (DSAL). One way this is done is by adding additional characters such as numbers, letters, or other characters to the URL. As an example the DSAL might be http://split.nyclshoe-store-T9pkFqP9. The DSAL is immediately specific to the sender (i.e., it is linked to the sender's existing profile as maintained by the DSAL provider (e.g., Split Technologies, Inc.) and is soon-to-be specific, to the recipient (once the recipient is known and registered with the DSAL provider). The sender then shares the generated DSAL (via text or another suitable method) with a specific recipient or recipients (e.g., with second device (It is noted that a user can be known but not registered as soon as the link is clicked.)

In step S206, the ID module 116 receives notification that the DSAL has been clicked by the receiver of the second device 124. The ID module 116 then drops or collects "cookies" into the clicker's browser and records information about the clicker's device (the second device 124) into the ID database 117, including information such as, but not limited to, IP address, screen brightness, phone type, browser type, etc.

In step S208 the ID module 116 determines whether the clicker's browser's "cookies" match a user profile that is already stored in the user profile database 118 of the server 102. If a clicker browser's "cookies" match a user profile that is already stored in the user profile database 118 ("YES"), then in step S210 the "recipient field" of the DSAL is "completed." If, on the other hand, recognized "cookies" don't already exist ("NO"), the ID module 116 attempts to link this new clicker's device with an existing user profile (step S212) or creates a new user profile (step S214). Creating a new user profile in step S214 is done by, for example, displaying a full-page banner with a login option to social media such as Facebook, Twitter, etc. For example, a Facebook (or other social media) login option ties the Facebook для other social media) profile to the cookies in the browser.

Once the recipient has been identified and confirmed, in step S216 the server 102 awaits word from the affiliate network 126 on any commissions from the retailer in question. Alternatively, the server 102 can periodically ping the affiliate network 126 to request any commission information, or the server 102 can control the affiliate network and have access to commission information in the affiliate network.

While not shown in FIG. 2 it is noted that there is another option after step S212, which is to create a temporary account or profile for a recipient who does not log in to social media after being prompted. For example, if the recipient is not recognized by the system and does not log in to social media, even after one or more times clicking on a DSAL, a temporary account can be created for the recipient even though the system has no information on the recipient. Cookies are dropped into the recipient's browser anyway and then if/when the recipient finally logs in to social media the temporary account is backfilled. Then the recipient field of the DSAL can be completed and the recipient can be retroactively credited for the prior click(s).

The following provides an example application of the invention in still more detail. Suppose a sender finds an article, an item being sold, or a picture that the sender would like to send to another person or persons. For example, the sender of the first device 122 clicks on an icon to generate a double-sided affiliate link (DSAL). The icon can be embedded for example in mobile share menus. Then, a DSAL application of the invention can generate a double-sided affiliate link (DSAL), which can be used to identify both the sender and the receiver. The sender can send the double-sided affiliate link to the receiver using a first device via text message, iMessage, email, or any other messaging application.

When the receiver clicks on the double-sided affiliate link (DSAL) from a second device 124, the second device 124 is enabled to send a notification that the receiver clicked on the double-sided affiliate link (DSAL) to a server 102. Then first data identifying the second device 124 of the receiver can be collected from the second device. The first data can comprise information relating to the second device including but not limited to cookies, an IP address, a screen brightness level, a phone type, a web browser type of the second device, installed applications, time zone, and fonts. All or part of the first data or any information that can identify the second device can be stored as cookies in the web browser of the second device.

The server 102 determines whether the first data matches any user profile stored in the server 102, e.g., in the user profile database 118. If the first data matches a user profile stored in the server 102, identification of the receiver has been completed. If the first data does not match any user profile stored in the server 102, the second device 124 displays a banner providing an option for the receiver to log in to a social media account using the receiver's account. The social media account can be from, for example, Facebook, Google+, Tumblr, Twitter, etc.

When the receiver logs in to his or her social media account, the second device 124 sends second data provided by the social media account to the server. The second data can comprise, e.g., an identification number of the social media account, the receiver's name, birthday, location, address, friends list, favorite movies, favorite websites, favorite companies, marital status, etc.

The server 102 determines whether the second data matches any user profile stored in a relevant database of the server 102. If the second data matches a user profile stored in such database, identification of the receiver has been completed. If not, the server 102 creates a new or unclaimed user profile based on the first and/or second data. The new or unclaimed user profile can be temporary and can be used in creating a regular user profile when the receiver signs up for the company website that provided the DSAL through the sender.

The sender and/or receiver can be rewarded promptly after the sender and/or receiver has been identified, or the server 102 can communicate with a participating affiliate network 126 that will be benefited from the sender's and/or the receiver's interaction to receive a notification to the server 102 that the affiliate network 126 has been benefitted by the sender's shared DSAL with the receiver. For example, if the receiver purchases a pair of shoes on a shoe-shopping website that the sender recommended, the company running the shoe-shopping website is benefitted by the interaction of the sender and the receiver, and sends a notification to the server 102 that the company has been benefitted by the receiver's purchase. The sender and the receiver then are able to obtain rewards based for example on first data, second data, and/or the information provided by the affiliate network.

Figure 3:
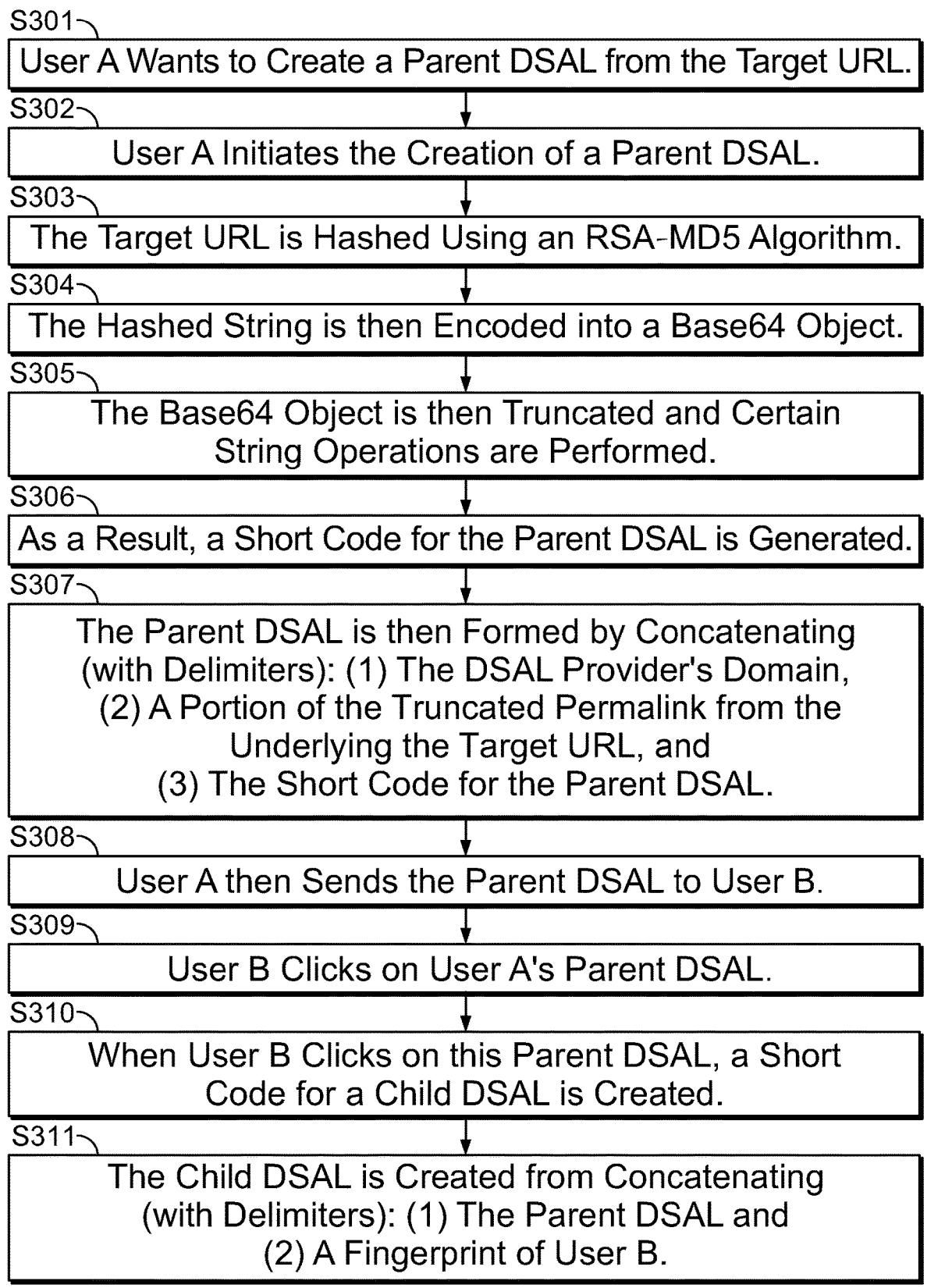
FIG. 3 is another flowchart showing the method according to an example embodiment, that can operate in accordance with the system of FIG. 1.

FIG. 3 is another flowchart showing the method according to an example embodiment, that can operate in accordance with the system of FIG. 1. This is explained below with regard to FIG. 3.

When User A initiates the creation of a parent. DSAL (step 302), according to an example embodiment of the invention, the following steps determine the "short code" for the parent DSAL (e.g., the alphanumeric code of "D7srNwP7" in the preceding example): (1) the target URL is hashed for example using an RSA-MD5 algorithm (Ron Rivest, Adi Shamir and Leonard Adleman-Message Digest 5 algorithm) (step 303), (2) the hashed string is then encoded into a Base64 object (step 304), (3) the Base64 object is then truncated and predetermined string operations are performed (step 305), and (4) as a result of step 305, "Short code" for the parent DSAL is generated (step 306).

The parent DSAL is then formed by concatenating (with delimiters): (1) the DSAL provider's domain (e.g., www.s-plit.nyc), (2) a portion of the truncated permalink from the underlying target URL, and (3) the short code for the parent DSAL(step 307). The permalink can be identical to the target URL or can differ from the target URL. The permalink is obtained from the page metadata when possible, otherwise it is identical to the target URL.

A "fingerprint" of User A can be tied to the parent DSAL through the database, preventing the fingerprint of User A from being unnecessarily exposed to the public. For example, the parent DSAL is stored in the database with a unique user ID of User A. For example, an SQL table in the database can contain among other data items, the parent DSAL and the user ID of User A. The SQL table in the database can be utilized to look up a parent DSAL to see the user ED of User A.

The parent DSAL generated this way therefore can be jointly unique to and determined from User A, the target, and the time of the parent DSAL's creation.

When User B clicks on User A's parent DSAL (step 308), a short code for a child DSAL (e.g., "H1p1TcB2" in the above example) is generated by performing substantially the same steps as the steps to generate the short code for the parent DSAL step 310). The child DSAL is then created from concatenating (with delimiters): (1) the parent DSAL and (2) a "fingerprint" of User B (step 311).

The fingerprint of User B can be randomly generated for example using version 4 of the UUID protocol (Universally Unique Identifier protocol). The "fingerprint" is for example a string of unique random numbers assigned to each user. A user may have multiple fingerprints, but a given fingerprint is always associated with one unique user.

The child DSAL generated this way is therefore jointly unique to and determined from User A, the target URL (original URL), the time of creation of the parent DSAL, and User B's fingerprint. This implies that given the child DSAL, one can jointly identify User A, the target URL, and User B. DSALs are stored in the database, such as a PostgreSQL database, any other SQL database, NoSQL database, etc.

Figure 4:
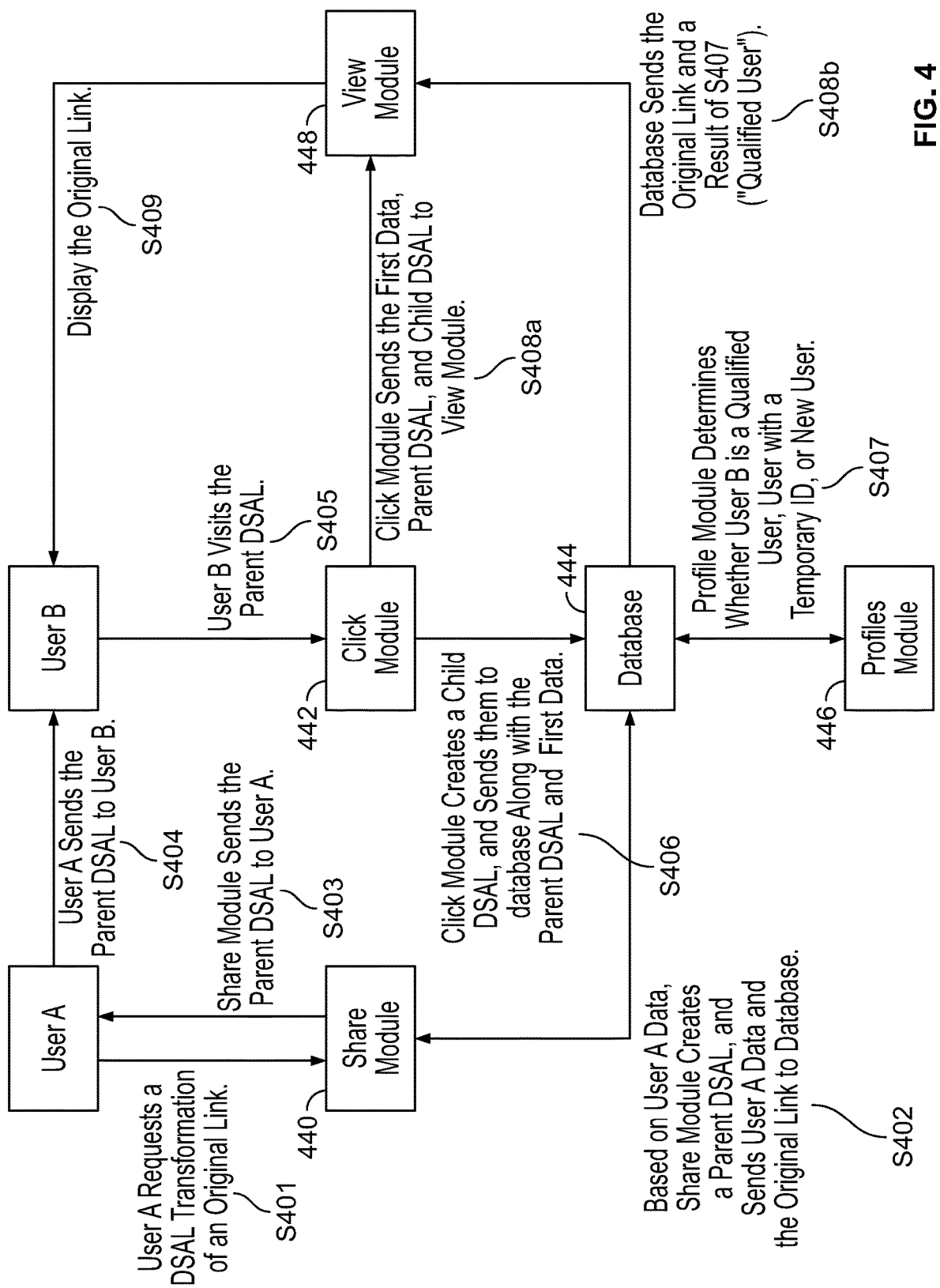
FIG. 4 is a flowchart showing the steps of a method of the present invention in an example embodiment where User A sends a DSAL to User B, who is using a device that can be recognized by the database.

FIG. 4 is a flowchart showing the steps of a method of the present invention in an example embodiment where User A sends a DSAL to User B, who is using a recognizable device. This is explained below with regard to FIG. 4.

User A wishes to share a product for example with User B and thus requests a DSAL transformation of an original URL to a share module (step 401). User A can request this transformation by clicking on or tapping an icon on a screen of a User A device, for example. The share module 40 receives the request.

The share module 440 then creates a parent DSAL based on the original URL and User A data, and sends the User A data and the original URL to a database 444 located on a server (step 402). As a on-limiting example, the parent DSAL might be http://split.nyc/watch-store-D7srNwP7, where D7srNwP7 represents data at least identifying the sender or User A. The User A data can comprise information about User A, such as a user ID of User A. The share module 440 sends the parent DSAL to User A (step 403). The parent DSAL can be automatically copied to a clipboard of the User A device so that User A can easily paste the parent DSAL to, for example, a text message. User A can send the parent DSAL to User B for example by sending the text message. When User B visits the parent DSAL sent by User A, a click module 442 creates a child DSAL based at least on the parent. DSAL and User B data; and sends first data, the parent DSAL and the child DSAL to the database 444 (steps 404-406). The User B data can comprise information about User B, such as a user ID of User B. As a non-limiting example, example the child DSAL might be http://split.nyc/watch-store-D7srNwP7/H1p1TcB2; that is, the child DSAL contains information relating to the URL, data relating to the sender User A (represented by an alphanumeric code for example such as D7srNwP7 above), and the receiver User B (represented by an alphanumeric code for example such as H1p1TcB2 above). (Other examples or formats for the parent or child DSAL can be used.) The first data can comprise for example, at least one of cookies collected from a User B device, an IP address, a screen brightness level, a phone type, a UDID (unique device identifier), a web browser type, or any other information that might help identify User B.

A profiles module 446 determines whether User B is a qualified user, a user with a temporary ID, or a new user based on information stored in the database 444 (step 407). A qualified user can be a user who fully signed up and was accepted by a security system as a compliant user. The click module 442 then sends the first data the parent DSAL, and the child DSAL to a view module 448 (step 408a). The database 444 sends to the view module 448 the original. URL and the result of step 407 (in this case, the result is "User B is a qualified user") (step 408b). The view module 448 displays content of the original URL on the User B device (step 409).

Figure 5:
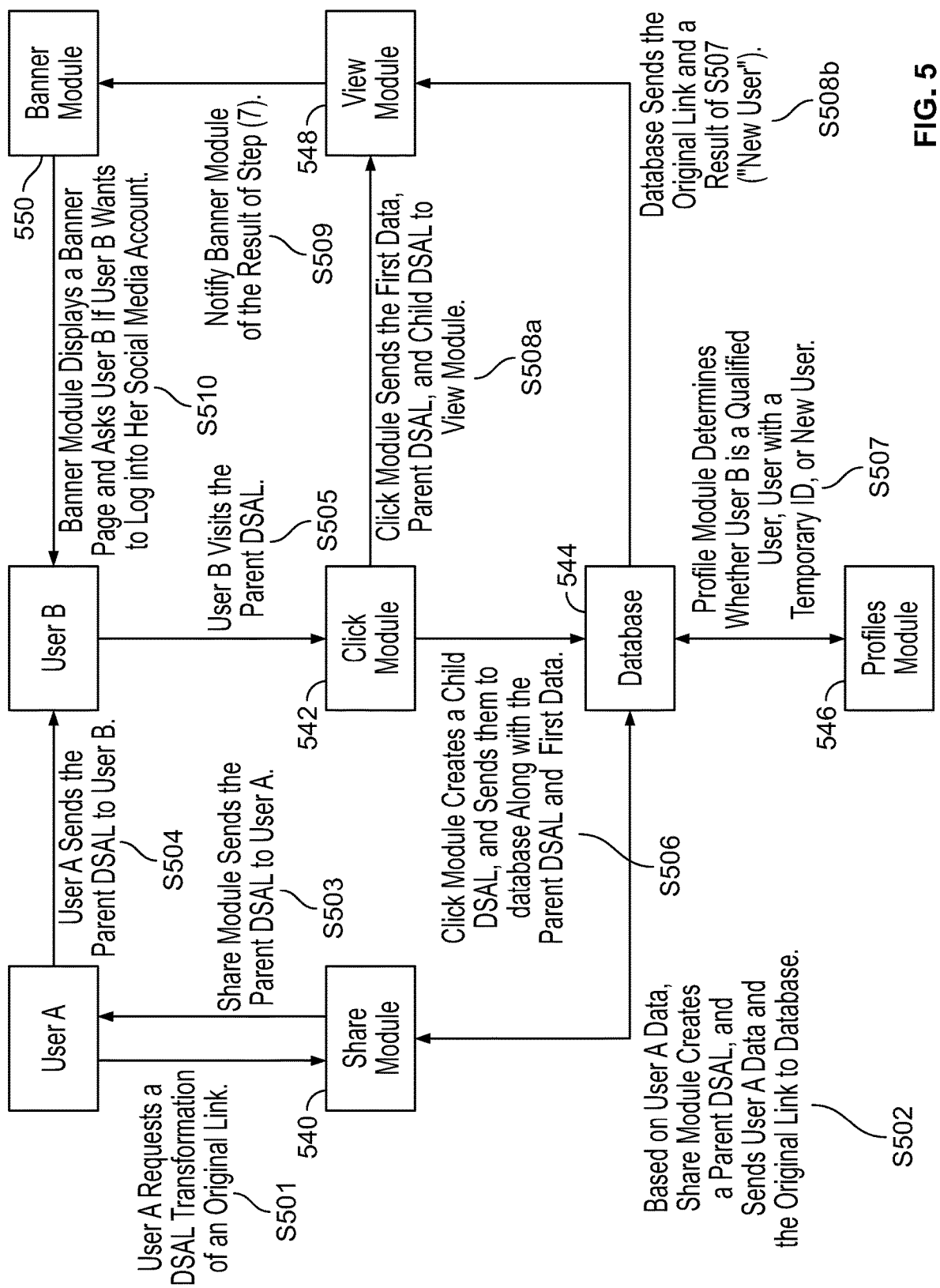
FIG. 5 is a flowchart showing the steps of a method of the present invention in an example embodiment where User A sends a DSAL, to User B, who is using a device that cannot be recognized by the database.

FIG. 5 is a flowchart showing the steps of a method of the present invention in an example embodiment where User A sends a DSAL to User B, who is using an, unrecognizable device. This is explained below with regard to FIG. 5.

Steps 501-506 of FIG. 5 are the sane as steps 401-406 of FIG. 4. The profiles module 546 sends the result of the determination of whether User B is a qualified user, a user with a temporary ID, or a new user (in this case, the result is "B is a new user.") to the database (step 507). The click module 542 sends the first data, the parent DSAL, and the child DSAL to the view module 548 (step 508a). The database 544 sends the original URL and the result of step 507 to the view module 548 (step 508b). The view module 548 notifies a banner module 550 of the result of step 507 (step 509). The banner module 550 then displays a banner page on the User device that asks User B if he or she wants to log in to an identification software with his or her account (step 510). The banner module 550 also can display a website or a small window whereby User B can log in to his or her account. The identification software can be a social media website.

Figure 6:
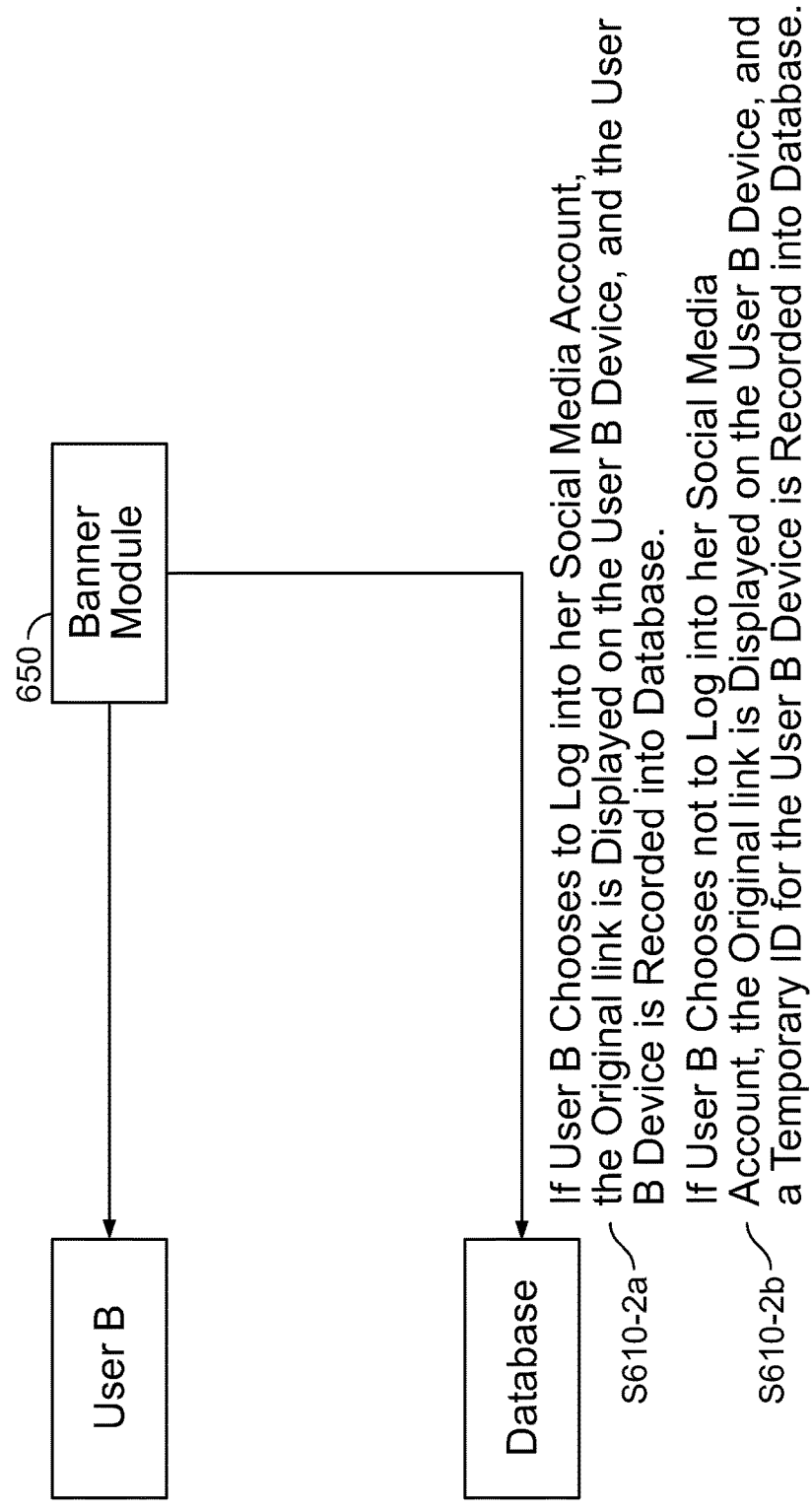
FIG. 6 is a flowchart showing more detailed operations of a banner module according to a method of the present invention in an example embodiment where User A sends a DSAL to User B, who is using a device that cannot be recognized b the database.

FIG. 6 is a flowchart showing more detailed operations of a banner module 650 according to a method of the present invention in an example embodiment where User A sends a DSAL to User B, who is using an unrecognized device. This is explained below with regard to FIG. 6.

If User B is already logged in to a social media account of User B with the User B device, then the User B device is automatically recorded into the database 444 (step 610-1). If User B is not logged in to the social media account of User B, then the banner module 650 displays a banner page on the User B device, by which User B can log in to the social media account of User B (step 610-2). If User B chooses to log into the social media account of User B through the banner page, content of the original URL is displayed on the User B device, and the User B device is recorded into the database 444 (step 610-2a). If User B chooses not to log into the social media account of User B, the content of original URL is displayed on the User B device, and a temporary ID for the User B device is recorded into the database 444 (step 610-2b). Cookies that can be used to identify the temporary ID can be stored in the User B device.

Figure 7:
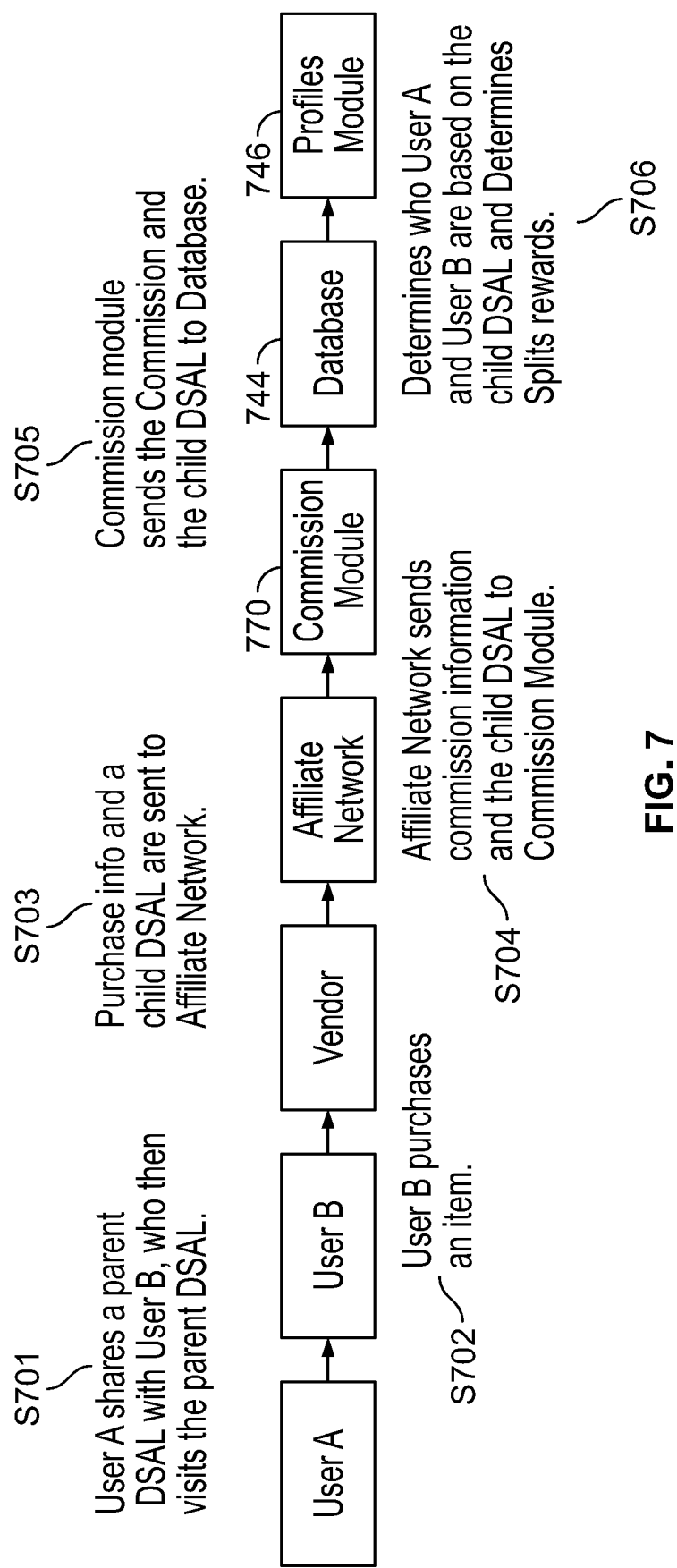
FIG. 7 is a flow chart showing an example scenario of a method of the present invention.

FIG. 7 is a flowchart showing an overall operation of one aspect of a method of the present invention. Below are explanations with regard to FIG. 7.

User A requests the share module 440 to transform a URL into a DSAL with a User A device (step 701) A parent DSAL is created by the share module 440 and then sent to User B (step 701) User B visits the parent DSAL with a User B device (step 701). The User B device can be a desktop, a tablet PC, a PDA, a mobile phone, or any other device that can perform the steps described herein.

When User B visits the parent DSAL, a child DSAL is created (e.g., b the click module) specific to User A and User B. A new child DSAL can be created for any different device or users visiting the parent DSAL. In other words, a parent DSAL can have a multiple child DSALs. User B then purchases an item on a website to which User B was directed after clicking the parent DSAL (step 702). Purchase information and the child DSAL are sent by a vendor to an affiliate network (step 703). It should be noted that other mechanisms such as an aggregator or the DSAL provider's internal module can be used instead of the affiliate network, in which case an aggregator module or an "affiliate" module can be configured to act as an affiliate network.

The affiliate network then sends commission information and the child DSAL to a commission module 770 (step 704). The commission module 770 sends the commission information and the child DSAL to a database 744 (step 705). A profiles module 746 determines who User A and User B are based on the child DSAL, and rewards are distributed to User A and/or User B based on reward data, wherein the reward data comprises the purchase information and the commission information. The rewards can comprise the commission, virtual money, points, etc.

Figure 8:
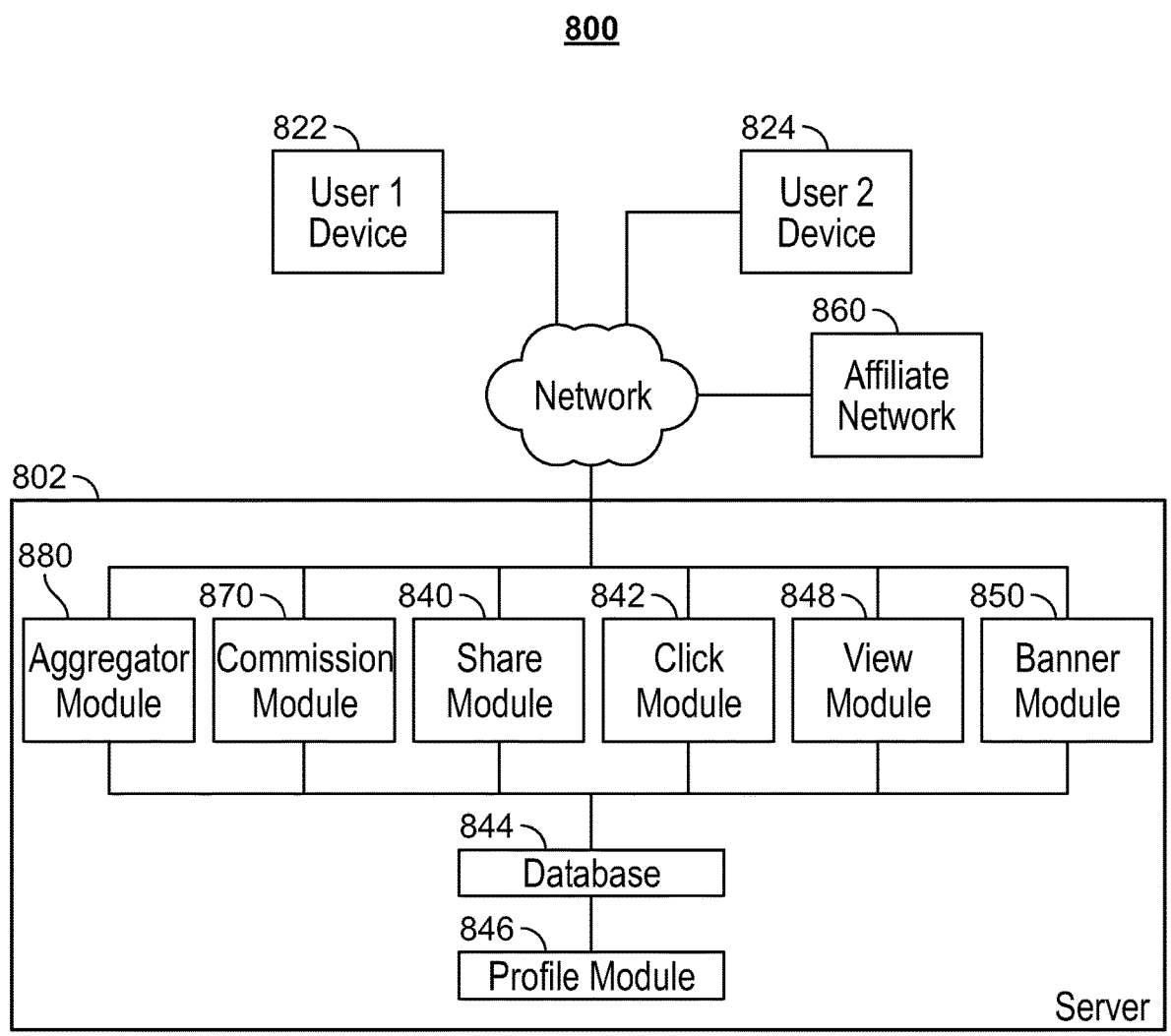
FIG. 8 is another example embodiment of a system or apparatus that operates in accordance with the present invention.

FIG. 8 is another example embodiment of a system or apparatus that operates in accordance with the present invention. Below are explanations with regard to FIG. 8.

A user device 1 822, a user device 2 824, an affiliate network 860, and a server 802 are connected through network. The server 802 can comprises a share module 840, a database 844, a profiles module 846, a click module 842, a view module 848, a banner module 850, a commission module 870, and an aggregator module 880. The aggregator module 880 can collect transactional information such as referrer user IDs, referee user IDs, vendor IDs, commission IDs, transaction times, transaction amounts, original. URLs, items referred, etc. In other words, the aggregator module 880 enables the system 800 to determine rewards for the referrer and/or the referee without any communication with an affiliate network 860.

FIG. 9 is a table that shows an example set of transactions stored in a database in accordance with an example embodiment of the present invention. The types of data can comprise source, commission time, user id, commission id, URL, link time, parent user ID (referrer user ID), vendor ID, child user ID (referee user ID), etc. As an example with regard to the second column of the table in FIG. 9, User A with user ID 755337 finds an item she wants to share with User B on http://example1.com. Upon User A's request, a first parent DSAL for the original URL can be created, and the time of creation i.e. "link time") can be recorded in the database 844 as in the second column of the table in FIG. 9.

Figure 13:
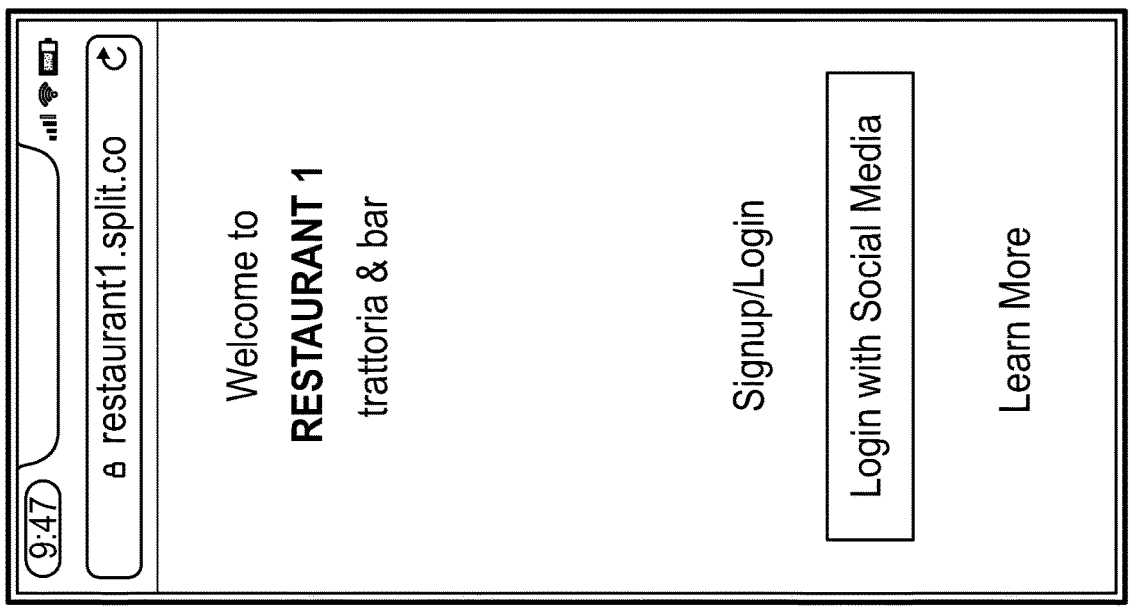
FIG. 13 shows an example screen of a mobile phone where a banner is displayed on a cellphone when a receiver of a DSAL is unknown.

User B with his cell phone clicks on the parent DSAL, which was sent to him from User A. In this example, User B is a new user, and thus the profiles module 846 determines that User B is a new user based on first data sent from the click module 842. Then, banner module 850 can display a banner that provides an option to login with a social media, as shown in FIG. 13. Here, User B decides not to login. The server records information of User B's cell phone, assigns a temporary ID to the cell phone, and stores first cookies in the cell phone. User B then completes a first transaction. In this case, the database 844 records User B "a user with a temporary ID" with user ID 879991 as in the third column of the table in FIG. 9. In other words, user ID 755337 (User A referrer) and user ID 879991 (User B's cell phone; referee) get first rewards even when User B is unknown to the profiles module 846, as in the second and third columns in FIG. 9. The first cookies contain information to identify User B's cell phone.

User A then sends a second parent DSAL for https:// example2.com to User B (see the fourth column of the table). This time, User B clicks on the second parent DSAL with his laptop, which is not his cell phone that contains the first cookies. Again, the profiles module 846 recognizes his laptop as a new user. User B's laptop is then given a temporary ID of 90000, and second cookies are stored in User B's laptop. User B completes a second transaction, and rewards are distributed to User A and User B, as in the fourth and filth columns in FIG. 9.

User A again sends a third parent DSAL for http://example3.com to User B (see the sixth column of the table). User B clicks on the third parent DSAL with his cell phone, in which the first cookies are stored. Profile module 846 recognizes User B's cell phone as a user with a temporary ID based the first cookies. User B again completes a third transaction without logging into the social media or signing up for the DSAL provider. Database 844 records this transaction as in the sixth and seventh columns, and rewards are distributed to User A and User B. User ID 879991, which is for User B's cell phone, now is recorded to have the rewards from the first and the third transactions. Third cookies can be stored to User B's cellphone, replacing the first cookies.

Figure 14:
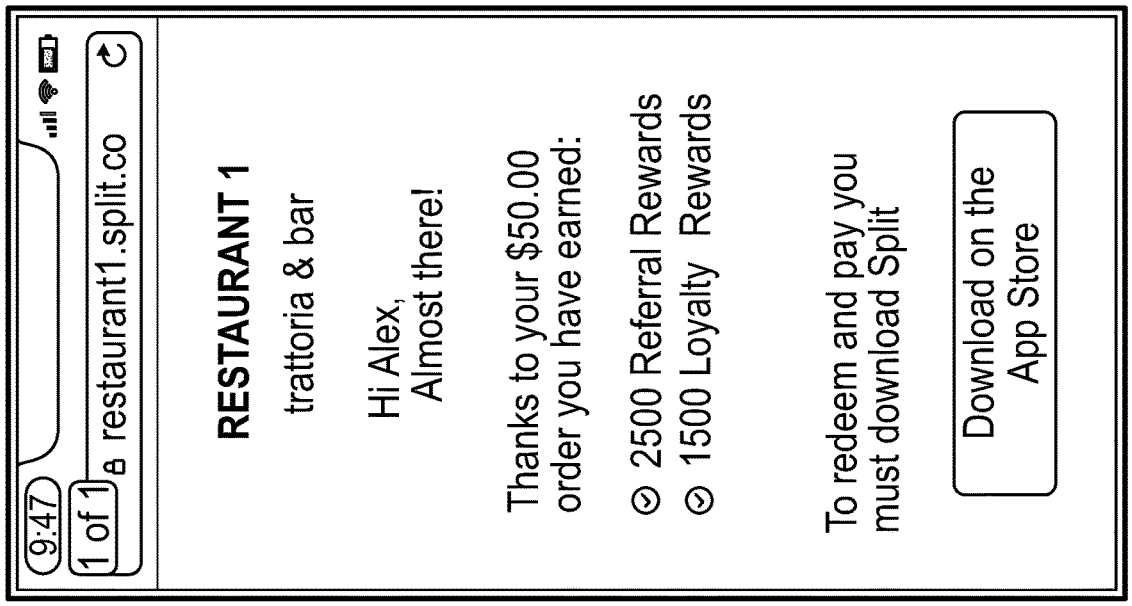
FIG. 14 shows an example screen of a mobile phone wherein a new user or a user with a temporary ID is provided with an option to sign up for the DSAL provider's website.

User A sends a fourth parent DSAL for http://example4.com to User B (see the eighth column of the table). User B clicks on the parent DSAL again with his cell phone but this time he decides to log into the social media. Profile module 846 recognizes that. User B is "a user with a temporary ID" based on the first cookies (or the third cookies), and links the temporary ID, which is designated to User. B's cell phone user ID 879991), to the User B's profile, which is provided by the social media. User B completes a fourth transaction, upon which banner module 850 can display on User B's cell phone an option to sign up for the DSAL provider, as in FIG. 14. User B finally signs up for the DSAL provider and is given a new user ID of 922222. The rewards that User B obtained from the first and the third transactions are matched or merged into User B's user ID of 922222 (see eighth and ninth columns of the table in FIG. 9).

User B later logs into the DSAL provider's website with his laptop, in which the second cookies are stored. The profiles module 846 recognizes that user ID 90000 retains the reward from the second transaction and matches or merges the reward retained by user ID 90000 into rewards retained by user ID 922222, which is User B's "qualified user ID."

In the above example, different devices (i.e., the cell phone and laptop) are used to explain one aspect of the present invention, but it should be noted that similar operations can readily apply to different web browsers when utilizing cookies. It should also be noted that when a user with a temporary ID signs up for the DSAL provider, her temporary user ID can be merged into her new qualified user ID or can become her qualified user ID that is the same user ID as her temporary user ID.

Figure 10:
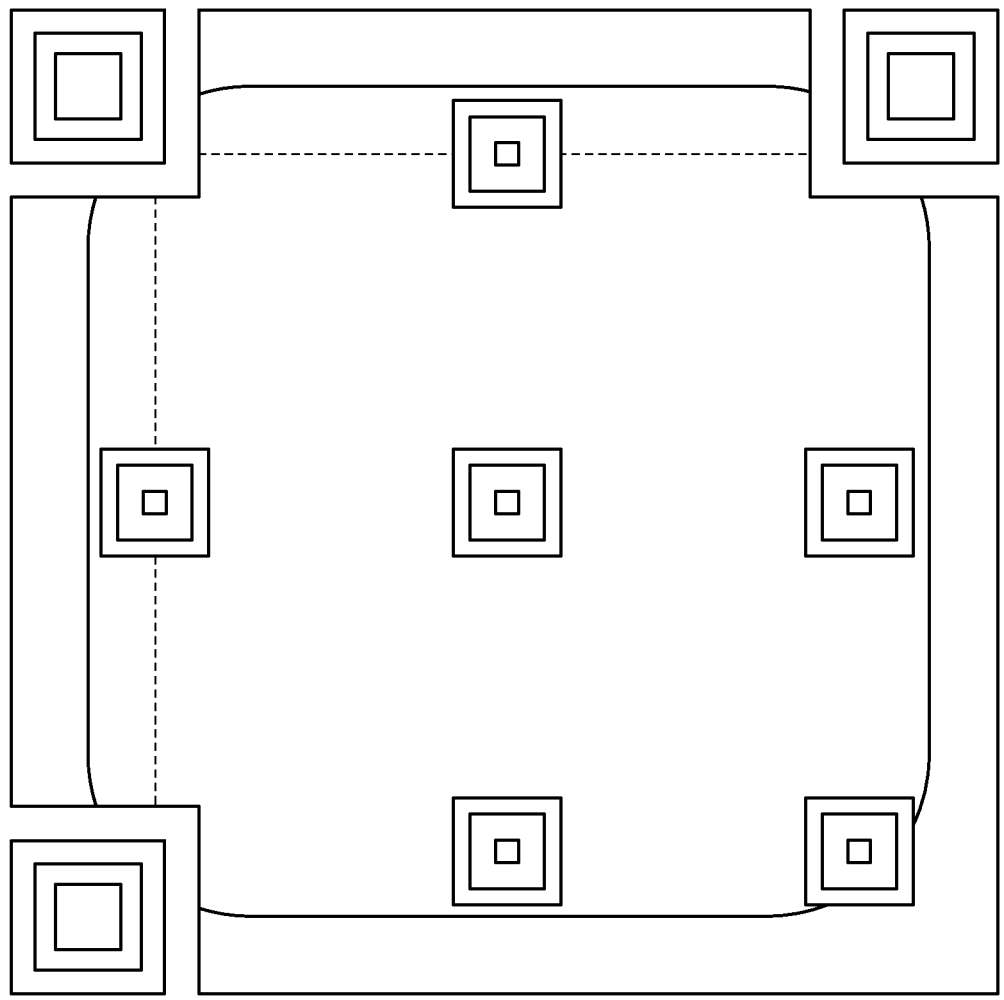
FIG. 10 is an example QR code that can be used in accordance with an example embodiment of the present invention.

FIG. 10 is an example QR code that can be used in accordance with the method of the present invention, it should be noted that a machine-readable optical label, such as a QR code in FIG. 10, can be used to display a parent DSAL. With the present disclosure, any link can be transformed into a parent DSAL. The parent DSAL then can be transformed into a QR code by the present disclosure. A security mechanism can allow only an authorized user to utilize the QR code transformed from a parent DSAL. In other words, the security mechanism can prevent a user from utilizing a QR code that is generated without the DSAL provider's authorization.

When the DSAL provider knows the source of the click, it can be determined if the clicker is an allowable source to decode a parent DSAL into the original URL. For example, it can be determined if the parent DSAL was clicked front within a Safari browser, Facebook messenger, Instagram etc. or if the parent DSAL was clicked from for example iOS 11's built-in QR code reader. For a given parent DSAL there could be a restriction that if the source of a click is from a QR code reader and the parent DSAL doesn't have a "flag" that allows QR codes, then the parent DSAL would not spawn a child DSAL and the clicker would not be redirected to the original Link. The flag would be set from within the DSAL provider's QR code creation platform or the QR code module. The clicker can be redirected to a web page that informs that he or she clicked on a counterfeit link.

This QR code can be displayed on a billboard, in a subway, on TV or other examples. A referee can simply scan the QR code with her device. In this case, the referrer does not need to know the referee's contact information to "refer" the link. Upon the referee's scanning of the parent DSAL, the referee is directed to the parent DSAL, and a child DSAL, which is specific to the referrer and the referee, can be created. One parent DSAL can have as many child DSALs as the number of people who scan the QR code. The child DSALs created this way can be utilized to identify the referrer and the referee(s).

Figure 11:
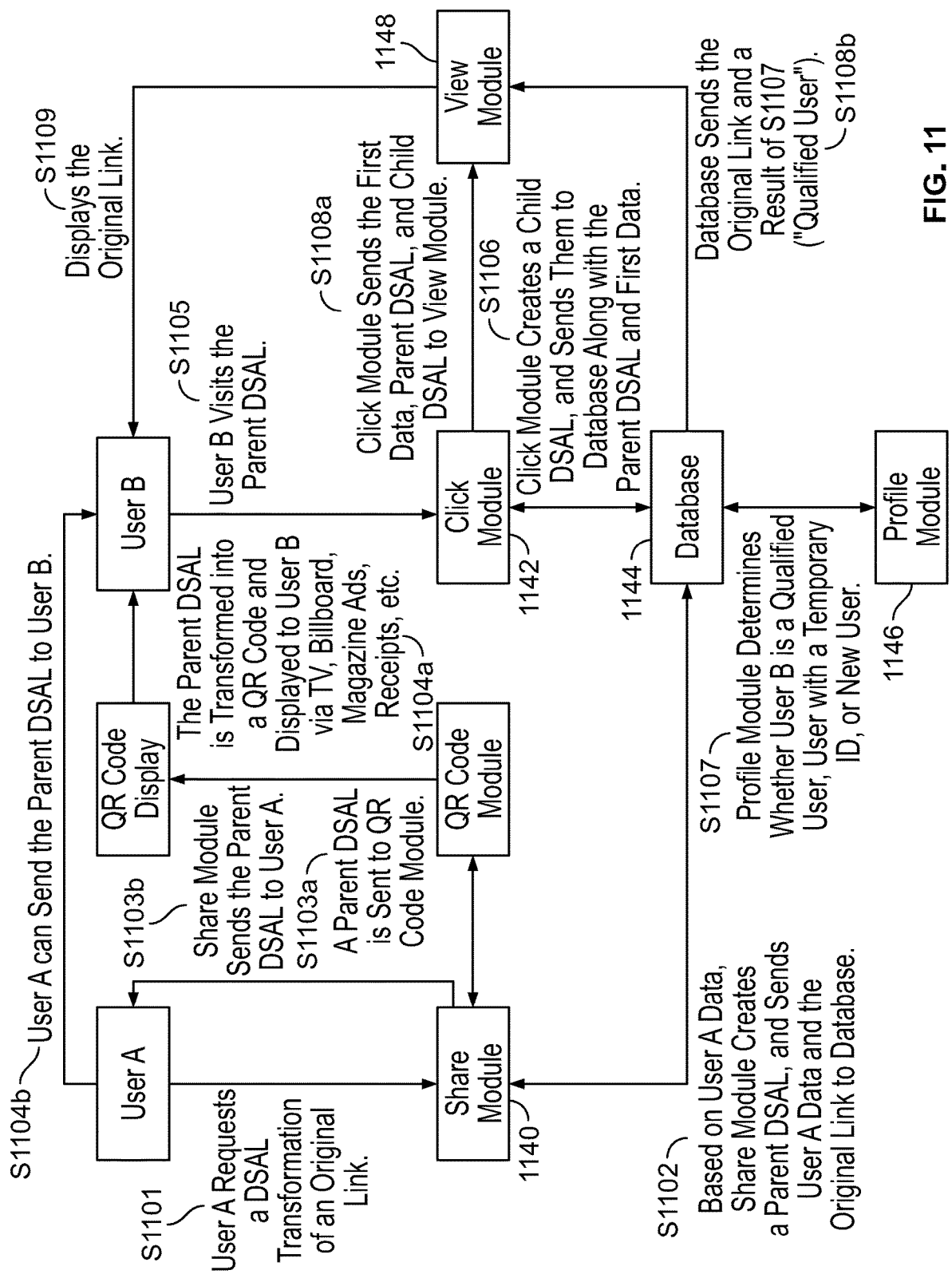
FIG. 11 is a flowchart showing the steps of a method of the present invention in another example embodiment wherein User B clicks on a parent DSAL in the form of a QR code.

FIG. 11 is a flowchart showing the steps of a method of the present invention in another example embodiment wherein User B "clicks on" a parent DSAL in the form of a QR code. Below are explanations with regard to FIG. 11.

User A requests a DSAL transformation of an original link (step 1101). A share module 1140 creates a parent DSAL based on User. A data and the original link. User A data can comprise User A's ID number. The share module 1140 sends User A data and the original link to a database 1144. The share module 1140 then sends the parent DSAL to a QR code module (step 1103*a*). The share module 1140 can optionally send the QR code to User A. The QR code module transforms the parent DSAL into a QR code (or any other machine-readable optical label).

The QR code can be printed on a physical object, such as billboards, magazine ads, ads in subways, receipts, etc., or even displayed on, a TV as in FIG. 12. A person with his or her smartphone (or any device that can read a QR code) can use his or her smartphone to scan (or "click on") the QR code. This interaction directs the person who scanned the QR code to the parent DSAL. In other words, scanning the QR code works essentially the same as clicking on the parent DSAL. For each clicker, a child DSAL that are specific at least the parent DSAL, to the referrer, and respective clickers can be created.

User B can "click on" a QR code displayed for example on a TV as in FIG. 12 (step 1104*a*). Optionally, User A can send the parent DSAL to User B (step 1104*b*). A click module 1142 creates a child DSAL that is specific to User A and User B (step 1106), and User B's device will show the original link of the parent DSAL (step 1109). Other steps can be substantially the same as described in reference to FIGS. 4-6.

According to an aspect of an embodiment of the present invention, a QR code as in FIG. 10 can be utilized in referrals at point of sale (POS). With this embodiment, a referee who ends up making a purchase "in-store" (as opposed to "on-line") can be identified and awarded. For example, a coffee store named Delicious Café uses a POS system (such as Square®, Lightspeed®, or ShopKeep®) and downloads the DSAL provider's App onto their equipment or hardware for example via the POS system's App Store (e.g., Squire®'s App Store), integrating Delicious Café's POS system with the DSAL provider's App. This integration allows Delicious Café to create an account for the DSAL provider by entering basic profile and/or account information, including all of Delicious Café's participating locations, websites, and domains so that the DSAL provider will know whom and/or which store of Delicious Café to reward referral credits if any of these domains/websites are ever sent between users. Delicious Café's POS system then can generate QR codes that customers can scan every time an order is rung up, for example, on a display of an electronic device or a receipt.

As an example of using DSALs with a POS system, User A sends a first parent DSAL that has been transformed based on a DSAL provider's link for Delicious Café, to laser B. User B visits the first patent DSAL, whereby a first child DSAL is created. User B then walks to Delicious Café, buys a cup of coffee, and arrives at the register. On the checkout screen (e.g., on an iPad®) is a QR code (or a machine-readable optical label) that is specific to the cash register that processes the coffee sale a second parent DSAL sent by Delicious Café that is specific to this sale that is currently appearing on the register). User B scans the QR code with his mobile phone, whereby a second child DSAL is created. The DSAL provider then recognizes that the clicker (i.e., User B) was recently referred from the first DSAL, and the first child DSAL can be returned to determine who the users were so that referral rewards can be credited between User A and User B based on the sale being made.

If on the other hand, User B had not been referred by User A and yet scanned the QR code at the register, the DSAL provider can see from a child DSAL created from UserB's scanning the QR code that User B was not referred. The child DSAL that is specific to Delicious Café, the sale being made, and User B can be returned so that instead of referral credits, "loyalty credits" can be applied between Delicious Café and User B. The "loyalty credits" is a term that indicates credits provided to a customer of a store.

Figures 15, 16:
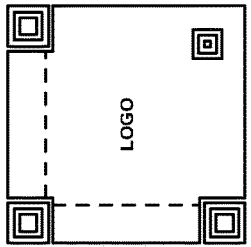
FIG. 15 shows an example receipt with a QR code, which directs a "clicker" to a parent DSAL.
FIG. 16 shows an example screen of a mobile phone to which a user is directed to after the user scanned the QR code on the receipt in shown FIG. 15.

According, to another aspect of the present invention, the DSALs and the QR codes can be utilized with a receipt. FIG. 15 shows an example receipt with a QR code, which directs a "clicker" to a parent DSAL. Here, a "referrer" is Restaurant 1 and a "referee" is a person who received the receipt from the restaurant. When Restaurant 1 prints the receipt, steps that are similar to steps 1101-1104 in FIG. 11 can be performed. In other words, a parent DSAL that is specific to Restaurant 1 and to each transaction can be created, and a QR code corresponding to the parent DSAL can be printed on the receipt.

When the referee scans the QR code as in FIG. 15, steps similar to steps 505-510 or 1105-1109 can be performed. If the referee is a qualified user, a payment screen, where the referee can make a payment and redeem his reward, can be shown as in FIGS. 16-17. If the referee is a new user, a banner that shows an option to login to a social media can be displayed as in FIG. 13.

It should be noted that User A can send a DSAL to multiple users. For example, after transforming an original link into a parent DSAL specific to User A, User A can choose to send the parent DSAL to multiple users. If User A sends the parent DSAL to Users B, C, and D, for example, each of Users B, C, and D receives the parent DSAL identical to each other. When Users B, C, and D separately or simultaneously click the parent DSAL, the click module 442 creates, based on the parent DSAL, a first child DSAL, a second child DSAL, and a third child DSAL specific to Users B, C, and D, respectively. The aforementioned steps can be applied to the child DSALs created this way to identify and reward the users. A virtually unlimited number of child DSALs can be created for a single parent DSAL.

It is noted that the present invention can limit the number of DSALs sent or rewarded by a particular user per day or per other time period, so that the user is not able to send or reward more than the allotted amount per period.

The databases and modules of FIGS. 4-7 could be implemented in the server 2 of FIG. 1, for example.

The present invention or any part(s) or function(s) thereof, including, e.g., the share icon module 12, the DSAL module 14, and the ID module 16, and the modules of FIGS. 4-7 (e.g., share module 40, click module 42, profiles module 46, view module 48, banner module 50, commission module 70) may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant an(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy, disk drive, a magnetic tape drive, an optical disk drive, etc. The removable storage drive reads from and/or writes to a removable storage unit in a well-known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

While the present disclosure has been particularly shown and described with respect to a preferred embodiment thereof, it should be understood that the embodiment has been presented by way of example, and not limitation. It will be apparent to persons skilled in the relevant art(s) that various changes in form and detail can be made therein without departing front the spirit and scope of the present disclosure. Thus, the present disclosure should not be limited by any above-described exemplary embodiment, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable such that it may be utilized (and navigated) in ways other than that shown in the accompanying figures.

What is claimed is:

1. A method implemented on a computer of a DSAL provider having a processor and a memory for identifying and rewarding a first user and a second user, comprising:
   providing a user interface that has an option to send a request to create a parent double-sided affiliate link (DSAL) on a device of the first user;
   upon receiving the request to create a parent DSAL from the first user, creating a parent DSAL, which is a link that is specific at least to a user ID of the first user and a uniform resource locator (URL) selected by the first user;
   displaying the parent DSAL on the device of the first user to enable the first user to share the parent DSAL with other users;
   creating a child DSAL, which is a link that is specific at least to the parent DSAL and a fingerprint of the second user who clicked on the parent DSAL, after the second user clicked on the parent DSAL, wherein the fingerprint of the second user is a string of random characters assigned to the second user, wherein a fingerprint of a user is created from at least one of cookies, login information to a website, an IP address, a screen brightness level, a phone type, a unique device identifier (UDID), and/or a web browser type;
   displaying on a device of the second user content of the selected URL after the second user clicked on the parent DSAL;
   sending the child DSAL to an affiliate network, wherein the affiliate network then sends the child DSAL to a device of a vendor;
   when the second user makes a purchase on the selected URL, receiving by the affiliate network purchase information and the child DSAL from the device of the vendor of the selected URL;
   receiving by the computer of the DSAL provider commission information and the child DSAL from the affiliate network; and
   using the child DSAL to identify the first user and the second user and to determine rewards for the first and second users;
   wherein the child DSAL is specific to one parent DSAL;
   wherein the parent DSAL identifies the first user but no other user and, when the second user clicks on the parent DSAL, the step of creating the child DSAL is triggered; and
   wherein the child DSAL identifies the first user and the second user but no other user.

2. A method according to claim 1, further comprising determining whether the second user who clicked on the parent DSAL is one of a plurality of specific user types based at least in part on first data, wherein the first data comprises at least one of cookies, an IP address, a screen brightness level, a phone type, a UDID (unique device identifier), and a web browser type of the device of the second user.

3. A method according to claim 1, further comprising displaying a banner page that provides the second user with an option to log in to a website on the device of the second user when the second user cannot be identified by the DSAL provider.

4. A method according to claim 3, determining whether the second user is a qualified user, a user with a temporary ID, or a new user based at least in part on second data, wherein the second data is provided by the website, wherein the qualified user is a user who has signed up with a DSAL provider or was accepted by a security system as a compliant user, and wherein the user with a temporary ID is a user who had clicked on any parent DSAL other than said parent DSAL and has not signed up with the DSAL provider.

5. A method according to claim 4, wherein the website is a social media website.

6. A method according to claim 4, wherein the second data comprises the second user's identification number.

7. A method according to claim 1, further comprising creating a new user ID for the second user who is determined as a new user.

8. A method according to claim 7, wherein the parent DSAL is tied to first user data using a table stored in a database, wherein the first user data comprises the user ID of the first user.

9. A method according to claim 1, further comprising storing new cookies comprising a user ID of the second user in the device of the second user.

10. A method according to claim 1, further comprising transforming the parent DSAL into a QR code.

11. A method according to claim 10, further comprising displaying the QR code on an object where the second user can scan the QR code with a scanning device.

12. A method according to claim 10, further comprising printing the QR code on an object where the second user can scan the QR code with a scanning device.

13. A method according to claim 10, further comprising directing the second user to a payment page where the second user who scanned the QR code can make a payment and redeem rewards that the second user has accrued.

14. A method according to claim 1, further comprising:
   providing a software program to a POS system (point of sale system) of a store, wherein the software program enables the POS system to generate a QR code that is embedded with the parent DSAL that is specific to the store and a purchase order;
   identifying a person who scans the QR code and the store; and
   determining whether the person was recently referred to the store by a user.

15. A method according to claim 1, further comprising merging rewards that have been assigned to a temporary user into rewards that have been assigned to a qualified user.

16. A method according to claim 1, further comprising:
   hashing the URL using an RSA-MD5 algorithm to generate a string;
   encoding the string into a Base64 object;
   truncating the Base64 object;
   performing a predetermined string operation on the Base64 object to obtain a short code for the parent DSAL; and
   creating the parent DSAL by concatenating, with delimiters, at least one of: a DSAL provider's domain name, a portion of a truncated permalink from the URL, and the short code for the parent DSAL.

17. A method according to claim 16, further comprising: creating the child DSAL by concatenating, with delimiters, at least one of: the parent DSAL and a fingerprint of the second user.

18. A method implemented on a computer of a DSAL provider having a processor and a memory for identifying and rewarding a first user and a second user, comprising the following steps, which are performed in the following order:
(a) providing a user interface that has an option to send a request to create a parent double-sided affiliate link (DSAL) on a device of the first user;
(b) upon receiving the request to create a parent DSAL from the first user, creating a parent DSAL, which is a link that is specific at least to a user ID of the first user and a uniform resource locator (URL) selected by the first user;
(c) displaying the parent DSAL on the device of the first user to enable the first user to share the parent DSAL with other users;
(d) creating a child DSAL when the second user clicks on the parent DSAL, wherein the child DSAL is a link that is specific at least to the parent DSAL and a fingerprint of the second user who clicked on the parent DSAL, wherein the fingerprint of the second user is a string of random characters assigned to the second user, wherein a fingerprint of a user is created from at least one of cookies, login information to a website, an IP address, a screen brightness level, a phone type, a unique device identifier (UDID), and/or a web browser type;
(e) displaying on a device of the second user content of the selected URL after the second user clicked on the parent DSAL;
(f) sending the child DSAL to an affiliate network, wherein the affiliate network then sends the child DSAL to a device of a vendor;
(g) when the second user makes a purchase on the selected URL, receiving by the affiliate network purchase information and the child DSAL from the device of the vendor of the selected URL;
(h) receiving by the computer of the DSAL provider commission information and the child DSAL from the affiliate network; and
(i) using the child DSAL to identify the first user and the second user and to determine rewards for the first and second users;
wherein the child DSAL is specific to one parent DSAL;
wherein the parent DSAL identifies the first user but no other user and, when the second user clicks on the parent DSAL, the step of creating the child DSAL is triggered; and
wherein the child DSAL identifies the first user and the second user but no other user.

19. A computer-readable storage medium storing a program, which, when executed by at least one processor of a computer of a DSAL provider, performs a method for identifying and rewarding a first user and a second user, comprising:
providing a user interface that has an option to send a request to create a parent double-sided affiliate link (DSAL) on a device of the first user;
upon receiving the request to create a parent DSAL from the first user, creating a parent DSAL, which is a link that is specific at least to a user ID of the first user and a uniform resource locator (URL) selected by the first user;
displaying the parent DSAL on the device of the first user to enable the first user to share the parent DSAL with other users;
displaying on a device of the second user content of the selected URL after the second user clicked on the parent DSAL;
creating a child DSAL, which is a link that is specific at least to the parent DSAL and a fingerprint of the second user who clicked on the parent DSAL, after the second user clicked on the parent DSAL, wherein the fingerprint of the second user is a string of random characters assigned to the second user, wherein a fingerprint of a user is created from at least one of cookies, login information to a website, an IP address, a screen brightness level, a phone type, a unique device identifier (UDID), and/or a web browser type;
sending the child DSAL to an affiliate network, wherein the affiliate network then sends the child DSAL to a device of a vendor;
when the second user makes a purchase on the selected URL, receiving by the affiliate network purchase information and the child DSAL from the device of the vendor of the selected URL;
receiving by the computer of the DSAL provider commission information and the child DSAL from the affiliate network; and
using the child DSAL to identify the first user and the second user and to determine rewards for the first and second users;
wherein the child DSAL is specific to one parent DSAL;
wherein the parent DSAL identifies the first user but no other user and, when the second user clicks on the parent DSAL, the step of creating the child DSAL is triggered; and
wherein the child DSAL identifies the first user and the second user but no other user.

20. A system for identifying and rewarding a first user and a second user, comprising:
a server, wherein the server comprises a processor and a memory;
wherein the memory comprises computer readable instructions, which, when executed by the processor, cause the processor to:
provide a user interface that has an option to send a request to create a parent double-sided affiliate link (DSAL) on a device of the first user;
upon receiving the request to create a parent DSAL from the first user, create a parent DSAL, which is a link that is specific at least to a user ID of the first user and a uniform resource locator (URL) selected by the first user;
display the parent DSAL on the device of the first user to enable the first user to share the parent DSAL with other users;
display on a device of the second user content of the selected URL after the second user clicked on the parent DSAL;
create a child DSAL, which is a link that is specific at least to the parent DSAL and a fingerprint of the second user who clicked on the parent DSAL, after the second user clicked on the parent DSAL, wherein the fingerprint of the second user is a string of random characters assigned to the second user, wherein a fingerprint of a user is created from at least one of cookies, login information to a website, an IP address, a screen brightness level, a phone type, a unique device identifier (UDID), and/or a web browser type;
receive by an affiliate network the child DSAL, wherein the affiliate network then sends the child DSAL to a device of a vendor;
when the second user makes a purchase on the selected URL, receive by the affiliate network purchase information and the child DSAL from the device of the vendor of the selected URL;

receive by the server commission information and the child DSAL from the affiliate network; and use the child DSAL to identify the first user and the second user and to determine rewards for the first and second users;

wherein the child DSAL is specific to one parent DSAL;

wherein the parent DSAL identifies the first user but no other user and, when the second user clicks on the parent DSAL, the processor is caused to create the child DSAL is triggered; and wherein the child DSAL identifies the first user and the second user but no other user.

\* \* \* \* \*